Figure 1:
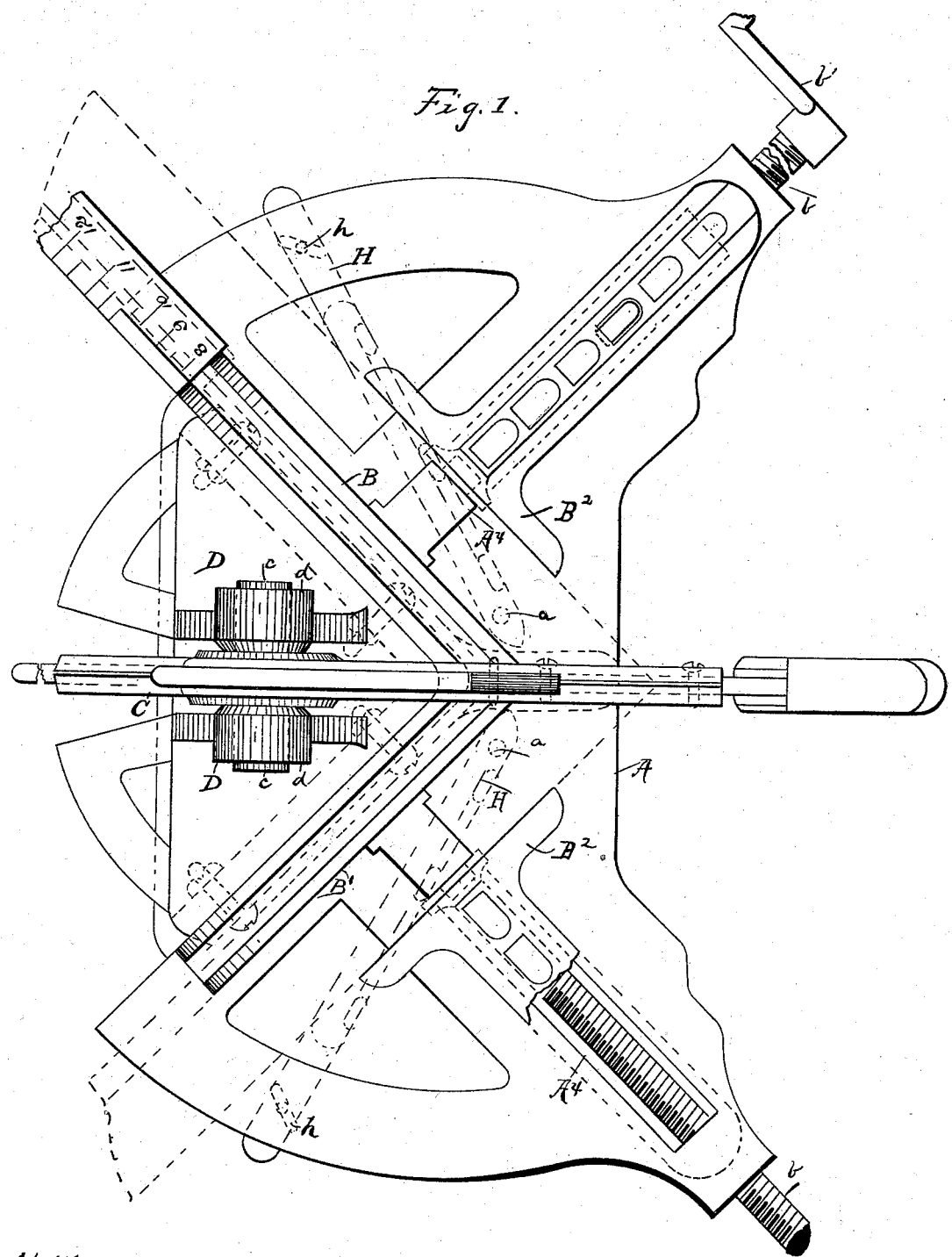

(No Model.) 4 Sheets—Sheet 1.

J. A. BRANDON.
MITERING MACHINE.

No. 505,024. Patented Sept. 12, 1893.

Witnesses
C. N. Stoors
Ward Hoover

Inventor
James A. Brandon
By Leggett & Leggett
Attorneys

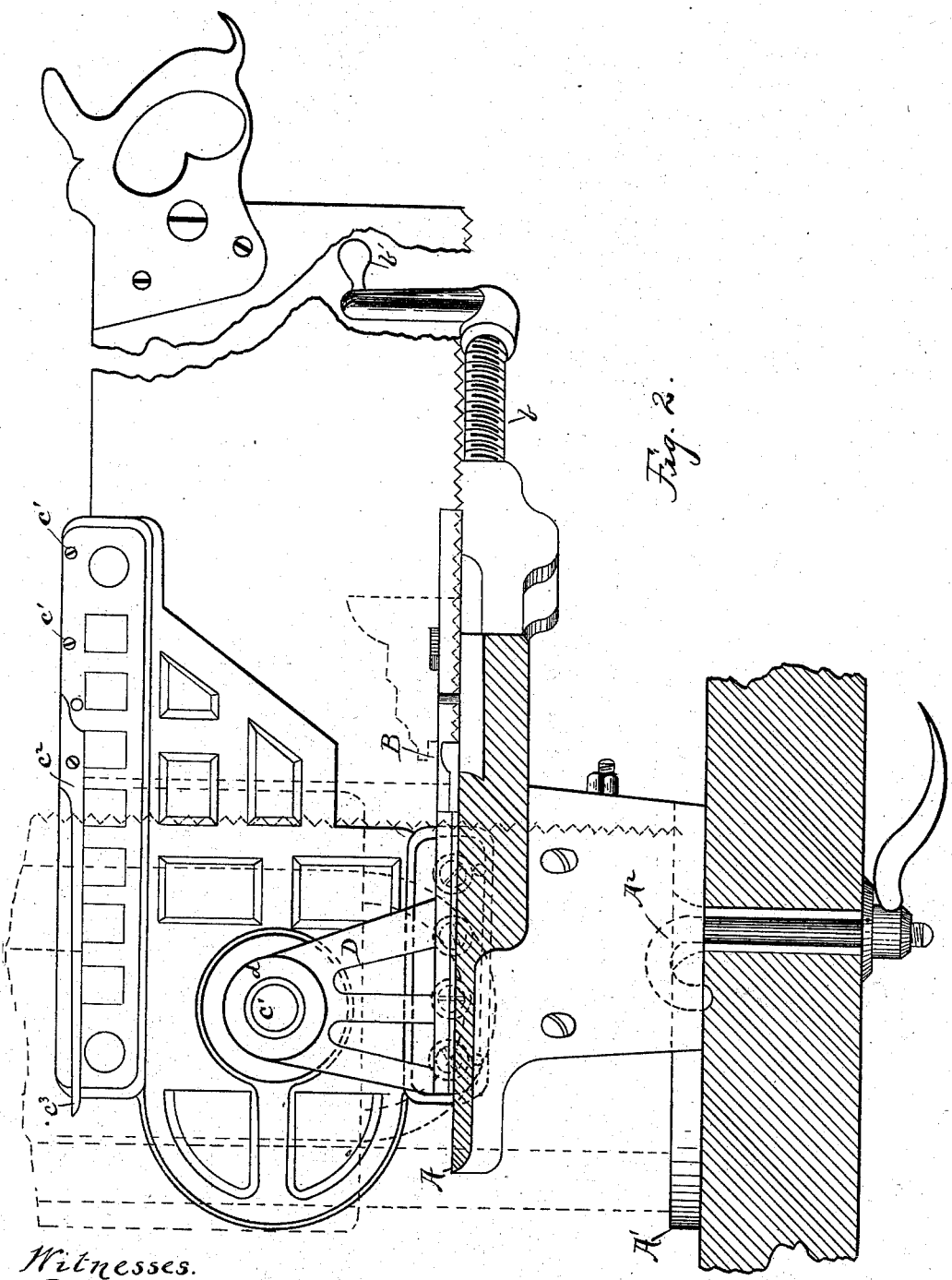

(No Model.) 4 Sheets—Sheet 3.
J. A. BRANDON.
MITERING MACHINE.
No. 505,024. Patented Sept. 12, 1893.
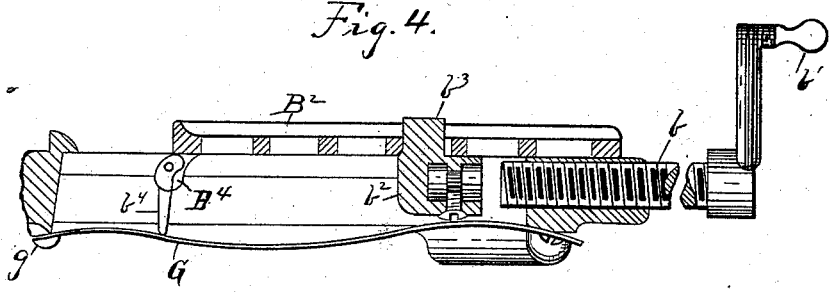
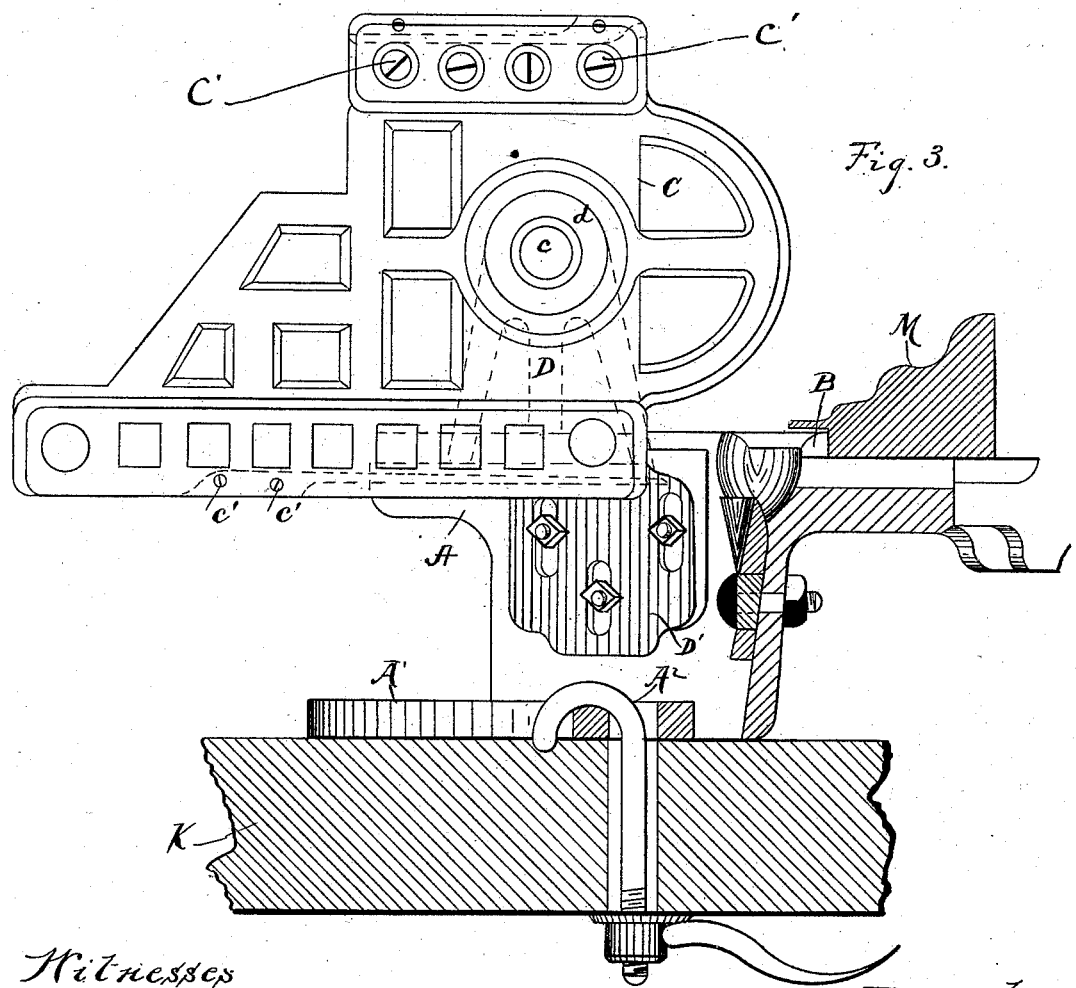
Witnesses
Inventor (No Model.)　　　　　　　　　　　　　　　　4 Sheets—Sheet 4.
J. A. BRANDON.
MITERING MACHINE.
No. 505,024.　　　　　　　　　Patented Sept. 12, 1893.
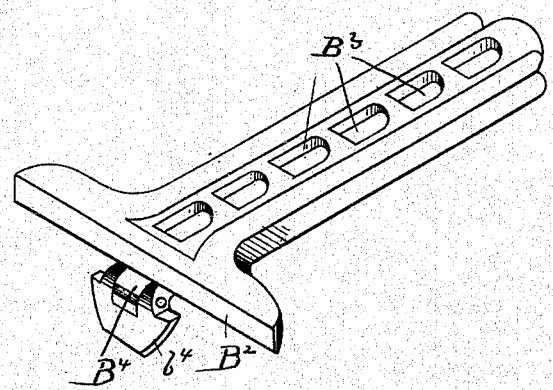
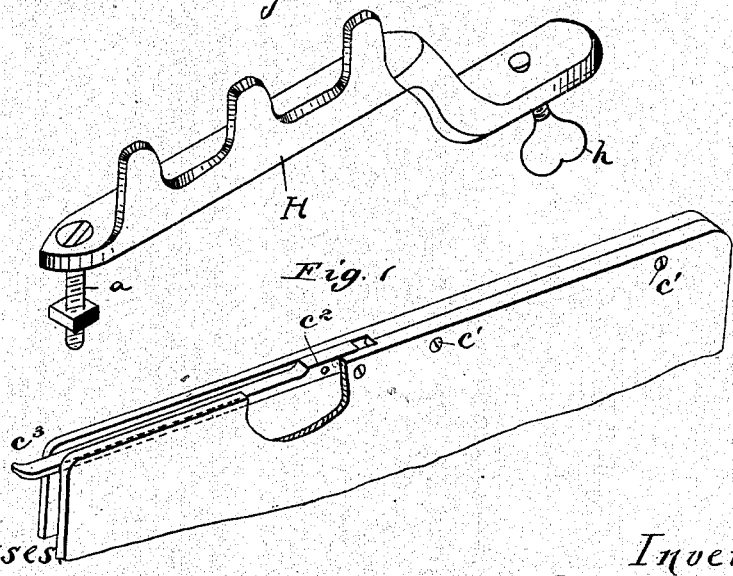

UNITED STATES PATENT OFFICE.

JAMES A. BRANDON, OF AKRON, OHIO.

MITERING-MACHINE.

SPECIFICATION forming part of Letters Patent No. 505,024, dated September 12, 1893.

Application filed December 11, 1890. Serial No. 374,276. (No model.)

*To all whom it may concern:*

Be it known that I, JAMES A. BRANDON, of Akron, in the county of Summit and State of Ohio, have invented certain new and useful Improvements in so-called Mitering-Machines; and I do hereby declare the following to be a full, clear, and exact description of the invention, such as will enable others skilled in the art to which it pertains to make and use the same.

My invention relates to improvements in so-called mitering machines; and it consists in certain features of construction and in combination of parts hereinafter described and pointed out in the claims.

In the accompanying drawings, Figure 1 is a plan view of my improved machine. Figs. 2 and 3 are vertical sections on Fig. 1, the saw and saw guide in each instance being in elevation. Fig. 4 is an enlarged elevation, partly in central section, in detail of clamp mechanism. Figs. 5 and 6 are details in perspective hereinafter described.

A represents the metal bed-plate of the machine, the same having a suitable depending section, A', that serves as a supporting-base or pedestal adapted to elevate plate A a convenient distance above, for instance, the bench, table, box or whatever the machine may, as the case may be, be permanently or temporarily mounted upon for convenience in working. The under face of member A' is usually flat and dressed off so that it may turn smoothly and easily on its support K, and the machine is usually secured by means of a single bolt, for instance, by hook-bolt $A^2$, as shown, the securing-bolt serving as an axis in turning the machine, so that plate A may also perform the functions of a turn-table, and it is found much more convenient to turn the machine in such a manner than it is to reverse the moldings or other work. Of course in operating upon short pieces this turning of the table is unnecessary, but when it is desirable to cut long strips, as is very frequently the case, it is of the greatest advantage to be able to swing the table around to accommodate the work. In manipulating the machine the latter may, therefore, be turned in the one direction or the other, so that the successive moldings, when in position in the machine for cutting the joints, will at the same time be in the position approximately lengthwise the bench or table on which the work is being done.

B B' are ledges, preferably cast integral with plate A, and against which ledges the work may be clamped in cutting miters. The faces of these ledges are planed off so that the lines thereof will cross each other at a right angle, and the saw F is hung so that the plane thereof will bisect this angle.

D D are opposing standards that might be cast integral with plate A, or, as shown, these standards may be cast separate and in the form of brackets, the lower sections D' thereof being adapted to be bolted to the opposing sides of base A', and as these sides are supposed to be at right angles to each other, if the holes for the securing-bolts are elongated, or a little large, the standards may be adjusted a trifle toward or from each other without changing the alignment of parts. These standards terminate above in heads $d$ $d$ that are cored laterally and in line with each other, and in the chambers of the heads are constructed the boxes or journal bearings for the trunnions $c$ of the saw-guide C. It would appear therefore that the saw having once been adjusted in proper alignment relative to the ledges aforesaid, the saw could not well lose its alignment in operating the machine, and therefore that work clamped against ledges B B' would be cut accurately at angles of forty-five degrees to form miter joints. A good saw-guide for the purpose, may be constructed, for instance, of soft fine grained cast iron, this metal being preferable on account of its durability and cheapness. The guide is usually made in halves and these may be fastened together by means of screws as shown at $c'$ $c'$, the two members or plates of the saw guide being blocked apart usually by means of several thin layers of paper inserted in the joints thereof so as to allow the saw to play freely in the guide without lateral play. Lateral holes are bored in the guide and located preferably as shown for inserting trunnions $c$, the protruding ends of these trunnions serving as supporting axial bearings to the guide, these trunnions extending into the chambers of heads $d\ d$ of standards D D. These trunnions may be constructed of solid metal pins, but I prefer to use tubes on account of the stiffness and lightness of the latter, but the pins, tubes, or whatever may be used for the purpose, should be turned off accurately and polished, after which they may be inserted in the lateral holes of the guides while the saw is held in position between the standards. The trunnions may be secured in these holes, for instance, by means of a driving fit, or they may be screwed in, if so preferred. With the broad surfaces of the saw-guide constructed as aforesaid, engaging the polished sides of the saw-blade, if these surfaces are kept lubricated the wear will be nearly normal so that no adjustment of these parts will be required until the machine has been used perhaps for many years, and when such adjustment is required it is easily made by first loosening screws $c'\ c'$ and removing one or more layers of the paper and then tightening the screws and the standards may be driven toward each other a trifle with or without loosening their securing-bolts, as may be found necessary. As the trunnions of the saw-guide are only turned a trifle in their bearings in elevating the saw from or feeding the saw to the work, the wear on these members is so slight that the trunnions and their boxes are likely to last for a life time without recasting the boxes. With such construction and by holding the work firmly against the ledges by means of clamps hereinafter described it would seem that at least miter-joints could be cut with accuracy and dispatch and without liability of mistakes.

For cutting the work at other angles I provide angle-bars hereinafter described, which latter being removable, may be laid aside, so as not to interfere with the regular and more important work, in which latter there is likely to be much competition, and hence a manufacturer's success will depend much on the dispatch and consequent cheapness with which he can do such standard or regular work.

With my improved apparatus the combined weight of the saw and saw-guide is sustained by the trunnions of the guide and as with the saw in a horizontal position, the axial line of these trunnions is some distance above or farther away from the work than the cutting edge of the saw, it follows that by raising the handle of the saw the saw is swung bodily toward the operator and is thereby elevated or moved farther away from the work, and that by lowering the handle of the saw the latter is swung in a direction to cause the cutting edge thereof to engage the work. The operator, as he reciprocates the saw, has only to gradually lower his hand to gradually feed the saw, and this may be done without tiring the hand or arm and with a little practice may be done so as to give approximately the desired uniform feed to the saw. With a gravity feed restrained only by the arm of the operator, if from any cause the saw teeth were to catch, that is to say, were to engage the work too freely, the saw teeth would inevitably be drawn into the work before the operator could control the saw as against such downward and instantaneous tendency.

To prevent the saw from being too rigidly fed to the work, a spring $c^2$, is secured to the saw-guide so that the free end thereof, $c^3$, may engage the back of the saw toward the forward end of the latter, and the hand of the operator engaging the handle of the saw performs the same office for the other end of the saw, whereby the saw is yieldingly held to its engagement with the work, so that in case the saw should, for instance, engage a hard knot the saw could raise a trifle and relieve itself without doing any harm and without stopping the saw.

As aforesaid, ledges B B' constitute the stationary jaws of the clamping devices and cooperating with these are the opposing movable jaws $B^2\ B^2$ supposed to be alike. The screws $b\ b$ for, respectively operating these movable jaws, are provided with handles $b'\ b'$ and with loose heads $b^2\ b^2$, each head having an upwardly-projecting lug $b^3$, the latter being adapted to operate successively in the vertical mortises $B^3$, each movable jaw being provided with a series of these mortises, as shown more clearly in Fig. 5.

Plate A is provided with slots $A^4$, $A^4$ to accommodate the screws and heads $b^2$ of the clamping devices, and each jaw $B^2$ has a depending lug, $B^4$, to which is pivoted a retaining catch, $b^4$, the shoulders of which catch extend under the edges of plate A on either side of slot $A^4$. With such construction the outer end of either movable jaw may be tilted upward to disengage the jaw from lug $b^3$, after which the jaw may be moved forward or backward to accommodate work of different widths, and when the jaw by depressing the free end thereof is again attached to the lug the screw is turned to clamp the work. It is therefore only necessary to actuate the movable jaw a comparatively short distance by means of turning the screw, and hence much time is saved in adjusting the movable jaw perhaps four or five inches to accommodate the work, whereas such adjustments made wholly by the screws would consume much time. Now the movable jaws must fit the guides loosely; otherwise they could not be moved by hand, and the jaws may have considerable lateral play so that they will fit the work, and such lateral play would not, in the least, interfere with the accuracy of the work, but any vertical play of the jaws is likely to tilt the molding and thereby spoil the work and this might occur in the following manner: the molding M is supposed to lie flat on plate A with the face edge of the molding bearing against the opposing ledge B. Now as the movable jaw engages the other or outer edge of the molding, if the movable jaw by reason of its vertical play is depressed, such depression of this jaw would do no harm because it would only tend to press the molding more firmly upon the plate. If, however, the movable jaw, as it engages the molding, should rise, it would likely raise the outer edge of the molding, thereby tilting the latter so that the joint cut, while the molding was thus tilted, would not fit any piece of molding that had been properly cut, and hence the molding, if cut just the required length, would be spoiled, and a molding might be thus tilted without attracting the notice of the operator. Now, to prevent the possibility of such mistake I provide a thin flat spring, G, located underneath and adapted to engage each catch $b^4$ by which engagement the catch is held elevated so that the shoulders of the catch always bear against the under side of plate A and hence there is never any upward movement of the movable jaw in clamping the work, and as the machine is turned successively in the one direction or the other and the moldings are clamped first against one ledge and then against the other, the clamping may be done in such a manner that a perfect joint can always be cut with little liability of mistake, and at the same time springs G are so light that they offer but little resistance in moving the jaws by hand. Springs G are rigidly attached at the outer end thereof to plate A, and are secured loosely at the other end, for instance, as shown at $g$, so that this end of the spring may play endwise through the fastening.

For cutting joints other than miters I provide removable angle-bars H H, see Fig. 6, made right and left handed, and these are respectively pivoted to plate A by means of removable screws or bolts as shown at $a$, Fig. 1, there being usually provided several bolt-holes in the plate for adjusting the angle-bars toward or from the stationary ledges according to the width of the work. The free ends of bar H extend under plate A as shown and are provided with thumb screws, $h$, and by tightening one of these screws against the under side of plate the angle-bar is held in adjustment. The operator usually lays out a piece of work accurately and then adjusts the angle-bar to bring the line laid out on the work parallel with the line of the saw, after which any number of pieces may cut to such angles. When the angle-bars are not wanted they may be removed so as not to be in the way in cutting miter-joints, the cutting of which latter, as aforesaid, is likely to constitute the regular and by far the greater part of the work done on the machine.

By referring to Fig. 1, it will be seen that slots $A^4$ of plate A are brought close to the ledges for entering and withdrawing catches $b^4$ in assembling or removing these jaws.

What I claim is—

1. In a mitering machine, the combination with a main frame, of a saw guide having horizontal bearings in the main frame at right angles to the saw guide whereby it may be swung in a vertical plane into various positions, said saw frame constructed to receive a saw and permit it to reciprocate therein, substantially as set forth.

2. A mitering machine consisting of a guiding device adapted to embrace, support and guide a saw, such guiding device mounted on trunnions approximately perpendicular to the plane of the guiding device, said guiding device capable of swinging to various inclinations between a horizontal and vertical position, and a reciprocating saw fitted to the guiding device and adapted to reciprocate therein, substantially as set forth.

3. A mitering machine comprising a turn table pivoted to a suitable support, clamping device constructed or adjusted so that the lines thereof form a predetermined angle to each other, suitable saw guide having horizontal bearings at right angles thereto mounted to turn in the turn table whereby the saw guide may be moved to different inclinations on the turn table and constructed to receive and embrace a saw, and a reciprocating saw fitted to the guide and adapted to reciprocate therein, substantially as set forth.

4. In a mitering machine, the combination, with a saw adapted to reciprocate in suitable guides, such guides being mounted on trunnions substantially as indicated, of one or more springs engaging the back of the saw for yieldingly holding the saw to its engagement to the work, substantially as set forth.

5. In a mitering machine, the combination, with a turn-table bearing stationary ledges or jaws, a pivotally mounted saw guide and a reciprocating saw fitted and adapted to reciprocate therein of opposing movable jaws and screws for operating the latter, each movable jaw having a series of mortises and the nuts of the actuating screw having lugs or projecting members adapted to engage these mortises, substantially as set forth.

6. In a mitering machine, the combination, with a turn table bearing stationary jaws, of movable jaws having catches pivoted thereto for holding the jaws upon the table, a spring adapted to engage the clamping end of the movable jaw or an attachment of the latter, such spring acting upward on the jaws for taking out the lost motion of the jaw from below, substantially as set forth.

7. In a mitering machine, the combination, with saw saw guide frame, turn table and clamping device, comprising a sliding jaw, and a screw adjustably connected with the jaw for moving the latter, of detachable angle-bars adapted to be adjusted at various angles and adapted when adjusted to serve as the stationary jaws for the clamping devices, substantially as set forth.

In testimony whereof I sign this specification, in the presence of two witnesses, this 17th day of October, 1890.

JAMES A. BRANDON.

Witnesses:
R. W. SADLER,
T. W. WAKEMAN.